US008879573B2

(12) United States Patent  (10) Patent No.: US 8,879,573 B2
Bahl et al.  (45) Date of Patent: Nov. 4, 2014

(54) MEDIA ACCESS CONTROL (MAC) PROTOCOL FOR COGNITIVE WIRELESS NETWORKS

(75) Inventors: Paramvir Bahl, Issaquah, WA (US); Ranveer Chandra, Kirkland, WA (US); Thomas Moscibroda, Redmond, WA (US); Gopala Sri Hari Narlanka, Bellevue, WA (US); Yunnan Wu, Redmond, WA (US); Yuan Yuan, Greenbelt, MD (US)

(73) Assignee: Microsoft Corporation, Redmond, WA (US)

( * ) Notice: Subject to any disclaimer, the term of this patent is extended or adjusted under 35 U.S.C. 154(b) by 184 days.

(21) Appl. No.: 11/847,034

(22) Filed: Aug. 29, 2007

(65) Prior Publication Data

US 2008/0130519 A1  Jun. 5, 2008

Related U.S. Application Data

(60) Provisional application No. 60/868,254, filed on Dec. 1, 2006.

(51) Int. Cl.
  *H04L 12/413* (2006.01)
  *H04W 16/14* (2009.01)
  *H04L 12/26* (2006.01)

(52) U.S. Cl.
  CPC ......... *H04L 12/2602* (2013.01); *H04L 43/0882* (2013.01); *H04W 16/14* (2013.01); *H04L 43/00* (2013.01); *H04L 43/16* (2013.01)
  USPC .......... 370/445; 370/459; 455/450; 455/509; 455/515

(58) Field of Classification Search
  USPC .............. 370/229, 230, 230.1, 235, 241, 252, 370/310, 345, 347, 348, 431, 433, 436, 437, 370/438, 439, 442, 443, 445, 447, 449, 458, 370/459, 462, 464, 465, 468; 375/130, 140, 375/141, 240, 240.01, 240.02; 455/403, 455/422.1, 434, 450, 462, 464, 39, 500, 455/507, 509, 515, 130, 150.1, 179.1; 709/223, 224, 225, 226
  See application file for complete search history.

(56) References Cited

U.S. PATENT DOCUMENTS 6,385,434 B1 * 5/2002 Chuprun et al. ............. 455/11.1
6,553,060 B2   4/2003 Souissi et al.
(Continued)

FOREIGN PATENT DOCUMENTS

EP       1750466 A1     2/2007
WO    WO 9821834 A2 *  5/1998
(Continued)

OTHER PUBLICATIONS

Bharghavan et al., "MACAW: A Media Access Protocol for Wireless LAN's", ACM SIGCOMM Computer Communication Review, vol. 24, No. 4, Oct. 1994, p. 212-225.*
(Continued)

*Primary Examiner* — Khoa Huynh
(74) *Attorney, Agent, or Firm* — Steve Wight; Judy Yee; Micky Minhas (57) ABSTRACT

A new media access control (MAC) protocol for cognitive wireless networks is described. The new MAC protocol allows each of multiple nodes, such as cell phones and computers with wireless, to determine utilization of a communication spectrum, such as the television broadcast band. The nodes collaborate to achieve a combined view of spectrum utilization in their local vicinity, in which scheduled users and empty time segments are mapped across a wide range of frequencies. Nodes negotiate with each other to reserve idle segments of the spectrum for packet exchange on negotiated frequencies. Control packet structure allows nodes to become prescient of the local spectrum utilization during handshaking. A cognitive device operating under the new MAC has a first radio that both scans the spectrum and monitors a control channel; and a second reconfigurable radio with adjustable parameters, including frequency and bandwidth, for packet transmission.

19 Claims, 9 Drawing Sheets

(56) References Cited

U.S. PATENT DOCUMENTS

| | | | |
|---|---|---|---|
| 6,735,633 B1 | 5/2004 | Welch et al. | |
| 6,882,851 B2 | 4/2005 | Sugar et al. | |
| 7,035,220 B1* | 4/2006 | Simcoe | 370/236 |
| 7,640,355 B1* | 12/2009 | Marshall et al. | 709/232 |
| 7,843,819 B1* | 11/2010 | Benveniste | 370/230 |
| 7,876,786 B2 | 1/2011 | Bahl et al. | |
| 2002/0155839 A1* | 10/2002 | Nisbet | 455/450 |
| 2003/0210680 A1 | 11/2003 | Rao et al. | |
| 2004/0095884 A1* | 5/2004 | Lee et al. | 370/235 |
| 2004/0137915 A1* | 7/2004 | Diener et al. | 455/456.1 |
| 2004/0264548 A1* | 12/2004 | Miyoshi | 375/141 |
| 2005/0289256 A1* | 12/2005 | Cudak et al. | 710/62 |
| 2006/0009209 A1 | 1/2006 | Rieser et al. | |
| 2006/0067354 A1* | 3/2006 | Waltho et al. | 370/433 |
| 2006/0133272 A1 | 6/2006 | Yuan et al. | |
| 2006/0268764 A1 | 11/2006 | Harris | |
| 2007/0091824 A1* | 4/2007 | Budampati et al. | 370/255 |
| 2007/0091998 A1* | 4/2007 | Woo et al. | 375/240.02 |
| 2007/0100922 A1 | 5/2007 | Ashish | |
| 2007/0104140 A1 | 5/2007 | Ashish et al. | |
| 2008/0080553 A1* | 4/2008 | Hasty et al. | 370/468 |
| 2008/0112427 A1* | 5/2008 | Seidel et al. | 370/433 |
| 2010/0046483 A1* | 2/2010 | Nandagopalan | 370/337 |
| 2013/0301622 A1 | 11/2013 | Bahl et al. | |

FOREIGN PATENT DOCUMENTS

| | | | |
|---|---|---|---|
| WO | WO 2004114598 A1 * | 12/2004 | |
| WO | WO2006120600 A1 | 11/2006 | |
| WO | WO2007052995 A1 | 5/2007 | |

OTHER PUBLICATIONS

Nissen, et al., "A Technology Enabled Framework for Dynamic Allocation of the Radio Frequency Spectrum", available at least as early as May 22, 2007, at <<http://www.mitre.org/work/tech_papers/tech_papers_04/04_1182/04_1182.pdf>>, pp. 10.

Raychaudhuri, et al., "CogNet—An Architecture for Experimental Cognitive Radio Networks within the Future Internet", available at least as early as May 22, 2007, at <<http://www.ittc.ku.edu/cognet/docs/CogNet_MobiArch_2006_060807b.pdf>>, pp. 6.

Werbach, "Radio Revolution: The Coming Age of Unlicensed Wireless", available at least as early as May 22, 2007, at <<http://werbach.com/docs/RadioRevolution.pdf>>, New America Foundation, pp. 55.

Yuan, et al., "KNOWS: Kognitiv Networking Over White Spaces", available at least as realy May 22, 2007, at <<http://research.microsoft.com/~ranveer/docs/cognitive-dyspan.pdf>>, pp. 12.

Bharghavan et al., "MACAW: A Media Access Protocol for Wireless LAN's", ACM SIGCOMM Computer Commincation Review, vol. 24, No. 4, Oct. 1994, pp. 212-225.

Non-Final Office Action for U.S. Appl. No. 11/847,034, mailed on Apr. 27, 2012, Paramvir Bahl et al., "New Media Access Control (MAC) Protocol for Cognitive Wireless Networks", 17 pages.

Office action for U.S. Appl. No. 12/906,837, mailed on Oct. 16, 2012, Bahl et al., "Dynamic Time-Spectrum Block Allocation for Cognitive Radio Networks", 9 pages.

Final Office Action for U.S. Appl. No. 11/847,034, mailed on Jan. 4, 2013, Paramvir Bahl et al., "New Media Access Control (MAC) Protocol for Cognitive Wireless Networks", 14 pages.

* cited by examiner

MEDIA ACCESS CONTROL (MAC) PROTOCOL FOR COGNITIVE WIRELESS NETWORKS

RELATED APPLICATIONS

This application claims priority to U.S. Provisional Patent Application No. 60/868,254 to Bahl et al, entitled, "New Media Access Control (MAC) Protocol for Cognitive Wireless Networks and New Cognitive Network Model," filed Dec. 1, 2006, and incorporated herein by reference.

BACKGROUND

Unlicensed bands, such as the 2.4 GHz and the 5 GHz Industrial-Scientific-Medical (ISM) bands, have become crowded in recent years due to the increasing popularity of mobile communications and wireless technologies such as Wi-Fi, Bluetooth and mesh networks. In contrast, a large portion of the licensed bands remain under-utilized or even unused over time. For example, the average utilization of the licensed spectrum allotted for television (TV) broadcast was as low as 14% in 2004. Based on these observations, the Federal Communications Commission (FCC) recently agreed to reconsider the possible legal operation of unlicensed devices in "white spaces," i.e., portions of the licensed TV bands that are not in active use by incumbent users, such as the TV broadcasters. This sub-GHz spectrum has several properties that make it desirable for data communication. In particular, its radio frequency (RF) communications can occur over longer distances and RF waves have better penetration properties in the lower bands compared to the higher frequency ISM bands.

The legitimate use of "commercial" media, such as TV broadcast bands, by unlicensed systems poses two major challenges. First, the unlicensed systems must not interfere with ongoing TV reception. Therefore, such a system should have a robust scheme for determining the white spaces, and second, these systems should have a spectrum-aware MAC protocol that efficiently utilizes white spaces of possibly varying bandwidths in available parts of the spectrum.

SUMMARY

A new media access control (MAC) protocol for cognitive wireless networks is described. The new MAC protocol allows each of multiple nodes, such as cell phones and computers with wireless cards, to determine utilization of a communication spectrum, such as the television broadcast band. The nodes collaborate to achieve a combined view of spectrum utilization in their local vicinity, in which scheduled users and empty time segments are mapped across a wide range of frequencies. The nodes negotiate adaptive radio-spectrum allocation such that the nodes self-organize into an efficient network without coordination from a central controller.

Nodes negotiate with each other to reserve idle segments of the spectrum for packet exchange on negotiated frequencies based on the combined view of the communication spectrum. During handshaking, control data is exchanged in a packet structure that allows nodes to become prescient of local spectrum utilization. A cognitive device operating under the new MAC has a first radio that both scans the spectrum and monitors a control channel; and a second reconfigurable radio with adjustable parameters including frequency and bandwidth, for packet transmission.

This summary is provided to introduce the subject matter of a new media access control (MAC) protocol for cognitive wireless networks, which is further described below in the Detailed Description. This summary is not intended to identify essential features of the claimed subject matter, nor is it intended for use in determining the scope of the claimed subject matter.

DESCRIPTION

Overview

Figure 1:
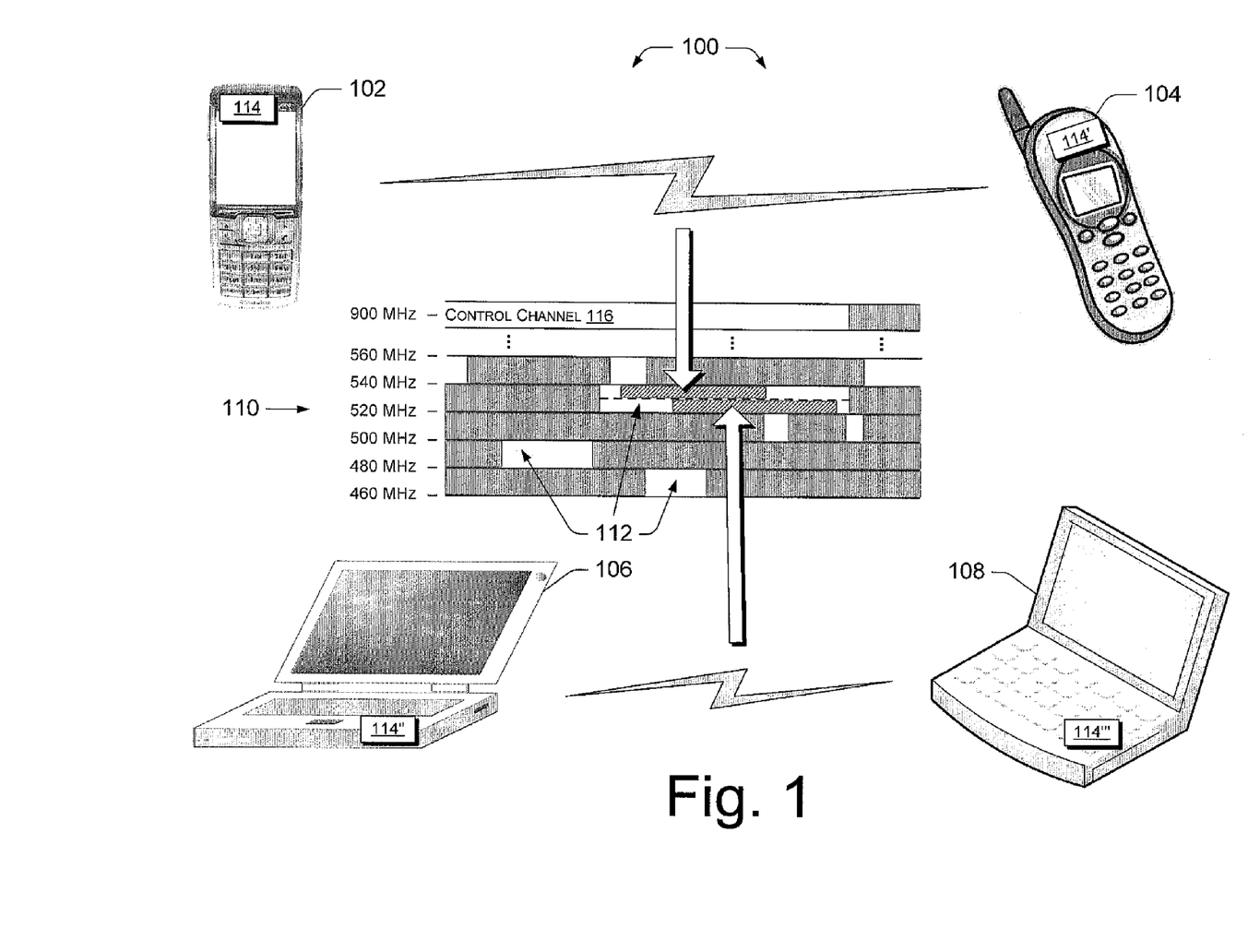
FIG. 1 is a diagram of an exemplary cognitive wireless networking system.

This disclosure describes a new media access control (MAC) protocol for cognitive wireless networks, referred to herein as the "CMAC." As shown in FIG. 1, in one implementation of an exemplary cognitive wireless network system 100, network nodes 102 (e.g., cell phones, computers 102, 104, 106, 108) in wireless Mesh networks negotiate adaptive radio-spectrum allocation such that the nodes self-organize into an efficient network without coordination from a central controller. Depending on the particular Mesh network to participate under the exemplary CMAC protocol, the nodes may be cell phones, mobile computing devices with wireless cards, etc., or a mix thereof. Each node has wireless cognitive radio capability, as will be described below. On a practical level, the exemplary CMAC protocol provides for a self-organized network, with very low deployment overhead. Users turn on communications devices, and the devices switch to a control channel and find the open spectrum bands ("white spaces") (e.g., within the TV spectrum) on which to communicate. The exemplary CMAC protocol can provide up to 200% throughput improvement over conventional systems that use an IEEE 802.11-based MAC protocol.

Exemplary System

Nodes functioning under the exemplary CMAC protocol scan a relatively wide range of frequencies of a medium 110, such as a radio broadcast spectrum, to find temporarily unused segments of communication bandwidth. For example, the nodes 102 may search for a channel that is idle or that will be idle. Two nodes communicate with each other by negotiating parameters, such as the center frequency, bandwidth, and timing of a data packet exchange to occur in the near future. The nodes thus exploit empty spectrum space 112 to maximize overall spectrum utilization. (Empty spectrum space 122 is depicted as white in FIG. 1 while occupied bands are depicted as grey.) In one implementation, the nodes 102 efficiently exploit unused resources of the TV spectrum, as introduced above.

Each node 102 contains an instance of an exemplary cognitive wireless networking engine 114. In each cognitive wireless networking engine 114, the exemplary CMAC provides protocol for a spectrum allocation engine—in each node—to maintain a distributed "resource allocation matrix" (RAMatrix). The RAMatrix can be thought of as a channel guide of sorts that shows when each frequency is available or in use by another node in the first node's vicinity; or by a licensed broadcaster that is not necessarily participating in the CMAC network. These previously scheduled users are referred to herein as ("incumbents"). Each node 102 in a radio range locality keeps its own version of the RAMatrix, for example, as an onboard bitmap, which it updates when it reserves a segment of the spectrum or when it "hears" (i.e., receives a packet containing spectrum reservation information) its neighbor nodes communicating with each other and reserving segments the spectrum. As reservations for a part of the spectrum are made on a common control channel, nodes can overhear their neighbor's reservations and can maintain an up-to-date RAMatrix. The RAMatrix allows each node to determine locally which parts of its spectrum are free. When making a new reservation, a node checks that the reservation does not overlap (collide) with an ongoing or existing reservation. This way, interference and collisions are prevented The exemplary CMAC protocol incorporates "virtual sensing" to arbitrate access to a fragmented spectrum. Specifically, the CMAC enhances the RTS (request-to-send)/CTS (clear-to-send) mechanism of IEEE 802.11, which reserves airtime on a channel, in order to reserve empty chunks of the spectrum, referred to herein as "resource blocks." Further, the spectrum allocation schema provides a mechanism that enables networked devices to maintain an up-to-date RAMatrix illuminating spectrum usage in their local neighborhood.

The CMAC adaptive spectrum allocation is different from the conventional methods of spectrum allocation, which divide the available spectrum into fixed channels of equal bandwidth. For example, in IEEE 802.11a, there are 13 orthogonal channels of 20 MHz bandwidth. This conventional fixed channelization structure is simple and incurs low implementation cost. However, such a structure creates hard boundaries for utilizing the entire spectrum. One implication is that it prevents users from bundling vacant channels to obtain higher data rates. Moreover, in the case of the TV spectrum, the spectrum can be fragmented by the incumbent signals, leaving various sizes of spectrum segments (i.e., spectrum bands of various different widths) available for sharing. The exemplary adaptive spectrum allocation adopted by the exemplary cognitive wireless networking system 100 deviates and improves upon this conventional channel concept. Under CMAC, the operating frequency and the bandwidth are adaptively determined based on local information.

In one implementation, an exemplary cognitive wireless network system 100 uses a narrow-band control channel 116. The control channel 116 is used to arbitrate the use of the available spectrum between all contending nodes. Nodes use the control channel 116 to make spectrum allocation reservations. Also, nodes overhear the reservations made by neighboring nodes and update their RAMatrix accordingly. This way, they can maintain a consistent view of the current and future spectrum allocation in their neighborhood. In contrast to systems that use a central spectrum controller with global knowledge of user activities and spectrum allocations, the exemplary cognitive wireless networking system 100 uses a distributed approach for efficient spectrum sharing. Each node 102 constantly listens on the control channel 116 to keep track of spectrum availability in real time. In one implementation, the bandwidth of the control channel 116 is set to 5 MHz, e.g., for a control channel 116 that is in the unlicensed ISM spectrum (902-928 MHz).

Using one fixed control channel 116 raises security concerns. The nodes 102 in the exemplary cognitive wireless networking system 100 cannot operate in the TV spectrum if the control channel 116 is occupied or jammed. In general, the control channel 116 used in the CMAC protocol can be a logical channel and is not restricted to a single, fixed physical spectrum band. In one implementation, a common hopping sequence to build the control channel 116 adds robustness. The control channel 116 can hop across the vacant TV channels according to a negotiated sequence at a coarse-time level (several seconds). In addition, the control channel 116 is typically different from the frequency band used for data communications. Different bands may have different propagation properties, for instance in terms of the transmission range. In one implementation, the effective range of the control channel 116 signals is less than the range of the data communication modality, to avoid scheduling the transmission of data packets that cannot actually be transmitted on the selected spectrum band for transmission because effective transmission range on this band is less than on the control channel.

The exemplary cognitive wireless networking system 100 enables opportunistic access and sharing of white spaces by adaptively allocating the spectrum among contending users. The exemplary cognitive wireless networking system 100 employs a distributed scheme that dynamically selects the operating frequency, the occupancy time, and communication bandwidth for data transmissions, based on the instantaneously available white spaces, the contention intensity, and the user demand. If there are few users in the system, the exemplary cognitive wireless networking system 100 provides each user with a larger chunk of the total available, free spectrum. It adaptively provides smaller chunks to all users if there are more contending nodes or if more parts of the spectrum are currently used by incumbent users.

In one implementation, a node 102 possesses a scanning radio (or simply "scanner") and a reconfigurable radio. The scanner periodically searches for white spaces in the TV spectrum, and the reconfigurable radio tunes to the white space and performs data communications. When not scanning, the scanning radio functions as a receiver listening for control packets on the control channel 116. This synergistic design of the radio platform and the CMAC protocol enables the exemplary cognitive wireless networking system 100 to provide collaborative detection of white spaces and adaptive spectrum allocation among contending users.

The exemplary spectrum allocation engine, to be described in greater detail below, enables users to adaptively adjust the time, frequency, and bandwidth of data transmissions in a fine time-scale. Dynamically adjusting the bandwidth of the channel for data transmission is in contrast to the widely-adopted spectrum allocation schemes used in IEEE 802.11 and IEEE 802.16, which divide the spectrum into static channels of fixed, pre-determined channel-width (bandwidth).

One goal of the exemplary CMAC-based cognitive wireless networking system 100 is to enable wireless nodes 102 to self-organize into a network without coordination from a central controller, which poses several challenges, including the following:

Robust white space detection. Unlicensed users need a robust way to discover the available white spaces. Different bandwidth chunks can be available at the sender and the receiver, therefore the goal is to use a spectrum chunk that is free for both of them.

Parallelism and connectivity. There is a tradeoff between parallelism of flows and connectivity in the network. To enable parallelism, different flows should be active in different chunks of the spectrum. However, this might prevent two nodes 102 (users) that are part of the same network from communicating with each other. One approach to solve this problem is to use schemes that have been proposed by multi-channel media access protocols. However, these approaches incur extra overhead.

Adaptive bandwidth selection. The amount of bandwidth assigned to a pair of communicating nodes 102 should depend on the total available spectrum, the contention intensity, and user traffic demand. Intuitively, when there are few users, each user should be assigned a wide bandwidth, which enables transmissions at a higher data rate; when there are more users within mutual communication range, the total spectrum should be divided into smaller chunks to accommodate more concurrent transmissions.

The exemplary cognitive wireless networking system 100 addresses the above challenges as follows. First, the exemplary cognitive wireless networking system 100 uses a collaborative scanning method to detect incumbent operators in the media, for example, in the TV bands. Therefore, only those portions of the spectrum that are detected to be available (i.e., not currently in use by an incumbent user) at the participating users are used for data communication. To address the second challenge, the exemplary cognitive wireless networking system 100 uses the common signaling channel 116 (e.g., in the ISM band) to avoid collisions and to maintain connectivity among nodes, even when they are transmitting or receiving on a different spectrum chunk. Parallelism is ensured by simultaneous data communication on the reconfigurable radio. The exemplary cognitive wireless networking system 100 addresses the final challenge by allowing nodes to opportunistically use available spectrum resources by reserving chunks of bandwidth at a fine time-scale. The width of an allocated chunk, as mentioned, depends on the amount of available spectrum and the number of contending nodes.

Exemplary Engines

Figure 2:
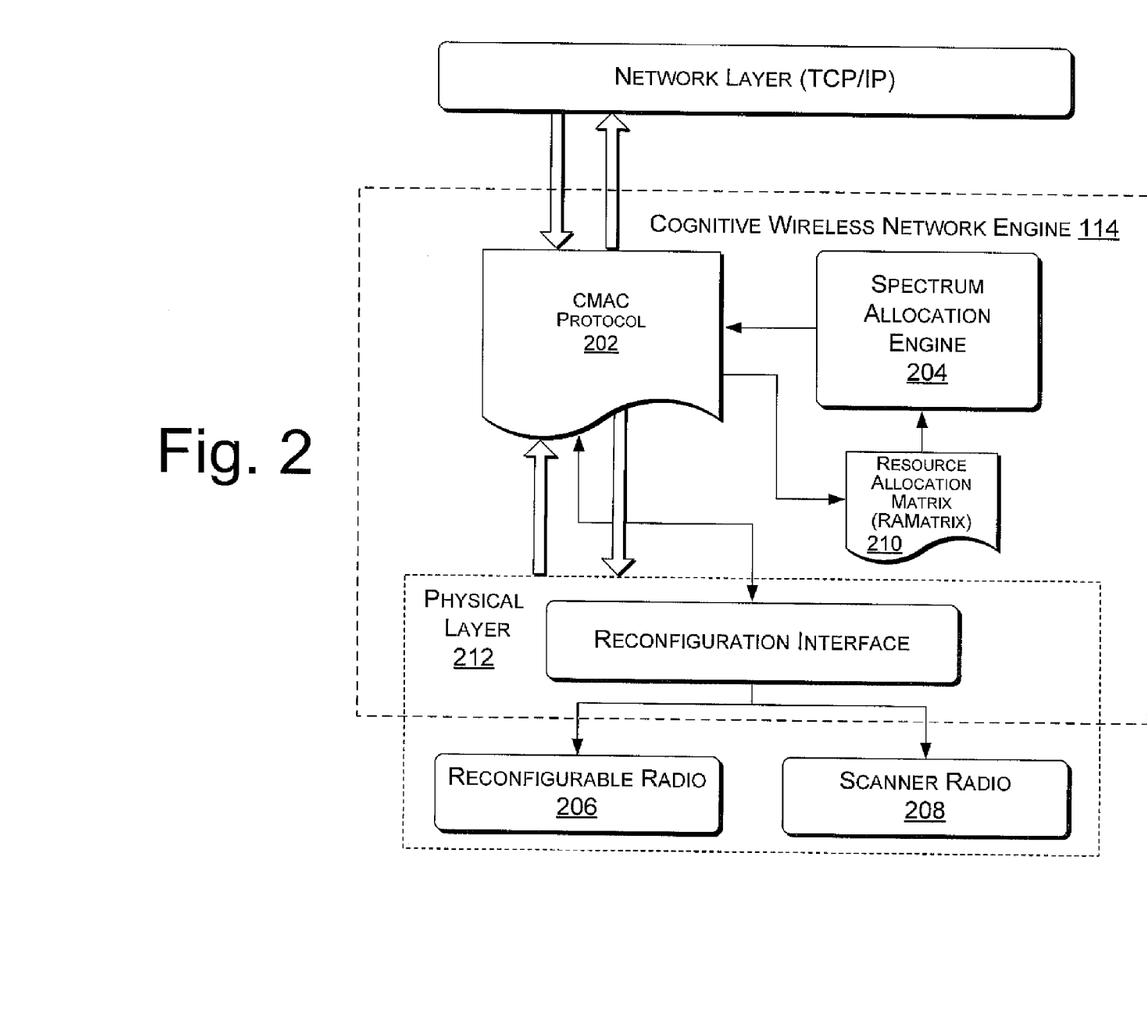
FIG. 2 is a block diagram of an exemplary cognitive wireless networking engine shown in FIG. 1, in greater detail.

FIG. 2 shows an overview of the exemplary cognitive wireless networking engine 114. The illustrated implementation is only one example configuration, for descriptive purposes. Many other arrangements of the components of an exemplary cognitive wireless networking engine 114 are possible within the scope of the subject matter. Implementations of the exemplary cognitive wireless networking engine 114 can be executed in hardware, software, or combinations of hardware, software, and firmware.

The illustrated cognitive wireless networking engine 114 include hardware, the MAC protocol (i.e., the exemplary CMAC 202), and the exemplary spectrum allocation engine 204. The hardware platform includes a dual-mode scanner 208 and a reconfigurable radio 206. The scanner radio 208 alternates between functioning as a scanner and a receiver. For example, it can scan the TV spectrum at least once every 30 minutes, as required by the FCC. The scanner radio 208 in one implementation takes less than 10 milliseconds to scan one 6 MHz TV channel. For most of the time, the scanner radio 208 works as a receiver and in one implementation is tuned to the 902-928 MHz unlicensed ISM band, which in one implementation is used as a control channel 116.

To enable efficient spectrum sharing, each node 102 stores the spectrum usage information of the near future in its local vicinity in a local data structure, e.g., the RAMatrix 210. The spectrum allocation engine 204 uses the information stored in the RAMatrix 210 to determine when, for how long, and in which portion of the unused spectrum the node 102 should reserve its next data transmission. The RAMatrix 210 is used by the spectrum allocation engine 204 to adaptively assign resource blocks 302 to each node 106 in the network. The CMAC protocol 202 conveys the reservation to the neighbors of the sender 106 and the receiver 108

Figure 3:
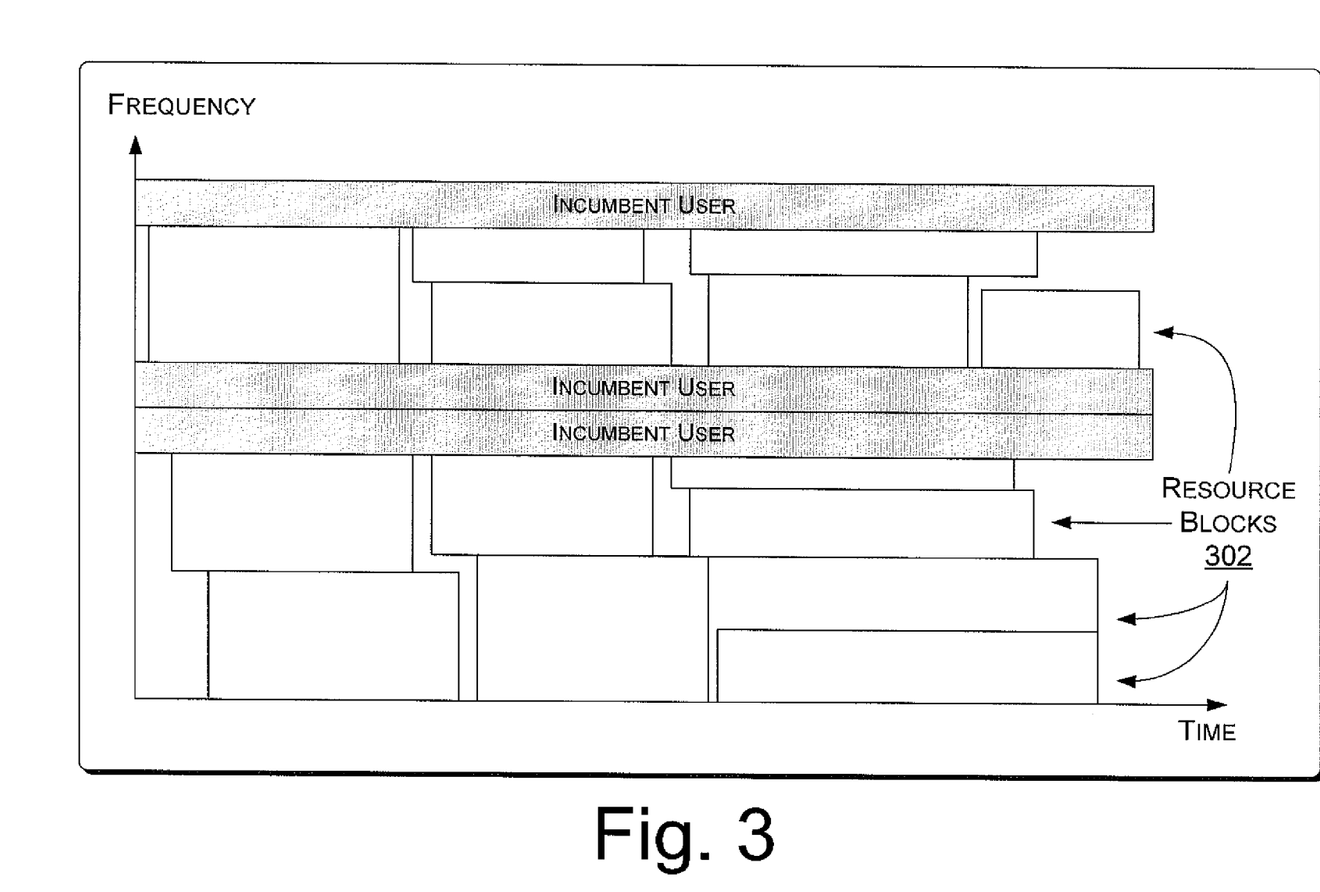
FIG. 3 is a diagram of exemplary resource block allocations stored in an exemplary resource allocation matrix.

The RAMatrix 210 records spectrum usage of neighboring unlicensed users in units of resource blocks 302. A resource block 302 can be defined as the time duration and the portion of spectrum that is reserved by a node 102 for its communication. FIG. 3 depicts one snapshot of resource block allocations stored in a RAMatrix 210. The bandwidth and time duration of each resource block 302 is tuned according to the perceived contention intensity, the total available resources, and can also depend on the queue length or traffic demand of neighboring nodes. The reconfigurable radio 206 is then configured to operate in the defined resource block 302. The reconfigurable radio 206 switches back to the control channel 116 after the resource block 302 is consumed.

Returning to FIG. 2, in the physical layer 212, the scanner/receiver 208 in conjunction with the CMAC protocol 202 builds the RAMatrix 210 and the spectrum allocation engine 204 implements a reservation-based mechanism that regulates spectrum access. Two communicating nodes 102 first contend for spectrum access on the control channel 116. Upon winning contention, a handshake is performed, which enables the spectrum allocation engine 204 at the sender and the receiver to collaboratively agree on a resource block. The reservation is announced on the control channel 116 to inform neighboring nodes 102. Accordingly, the sender, receiver, and all neighboring nodes populate their RAMatrix 210 with the new reservation, and nodes delete expired resource block allocations from their RAMatrix.

In one implementation, the reconfigurable radio 206 has a set of operational parameters that can be adjusted with low time overhead. The current implementation of the reconfigurable radio 206 uses a commodity IEEE 802.11g card to generate OFDM signals at 2.4 GHz. A wide-band frequency synthesizer is used to convert the received signals to the specified frequency. To control the reconfigurable radio 206, the interface to the MAC layer is a list of register values that specifies the operating frequency, bandwidth, and transmission power level. In one implementation, the operating frequency can be set from 512 to 698 MHz in 0.5 MHz steps, and the selectable bandwidth options are 5, 10, 20, and 40 MHz. The narrow bandwidth options, such as 5 MHz, are provided to use white space spectrum in between the incumbent operators (fragmented spectrum). The maximum output power is 200 mW and the power level is controllable from −8 to +23 (dBm). The threshold for packet reception in the TV band is −85 (dBm). The time overhead for adjusting the radio parameters, e.g. frequency, bandwidth, and power level, can be within 100 µs.

In one implementation, the scanner 208 periodically scans the spectrum 110 and locates the vacant pockets of spectrum 110 that are without incumbent signals. For example, in one version, the scanning algorithm is prototyped in the C programming language with a Python-based interface and is implemented on DSPs (digital signal processors) or FPGAs (field programmable gate arrays). The scanner 208 measures the signal power at a frequency range with a typical resolution of 3 KHz. On average, the scanner 208 takes at most 10 ms to scan one 6 MHz TV channel. The current setting of the DTV pilot tone detection sensitivity is −115 dBm. As required by the FCC, the TV spectrum should be scanned once every 30 minutes, since the TV signal arrives and leaves in a very coarse time level (several hours). Therefore, for most of the time, the scanner 208 works as a receiver operating on the control channel 116. The MAC layer protocol can change the scanning schedule and set the frequency range to scan by configuring the registers in the scanner 208

In one variation, a GPS receiver is incorporated in the hardware for loading location information and performing time synchronization. Based on the estimated location, the node 102 can identify unused spectrum in case a database with TV programming information is available. This is an alternative approach suggested by the FCC for detecting incumbent users. Therefore, the GPS receiver can extend the flexibility of the exemplary cognitive wireless networking system 100.

Figure 4:
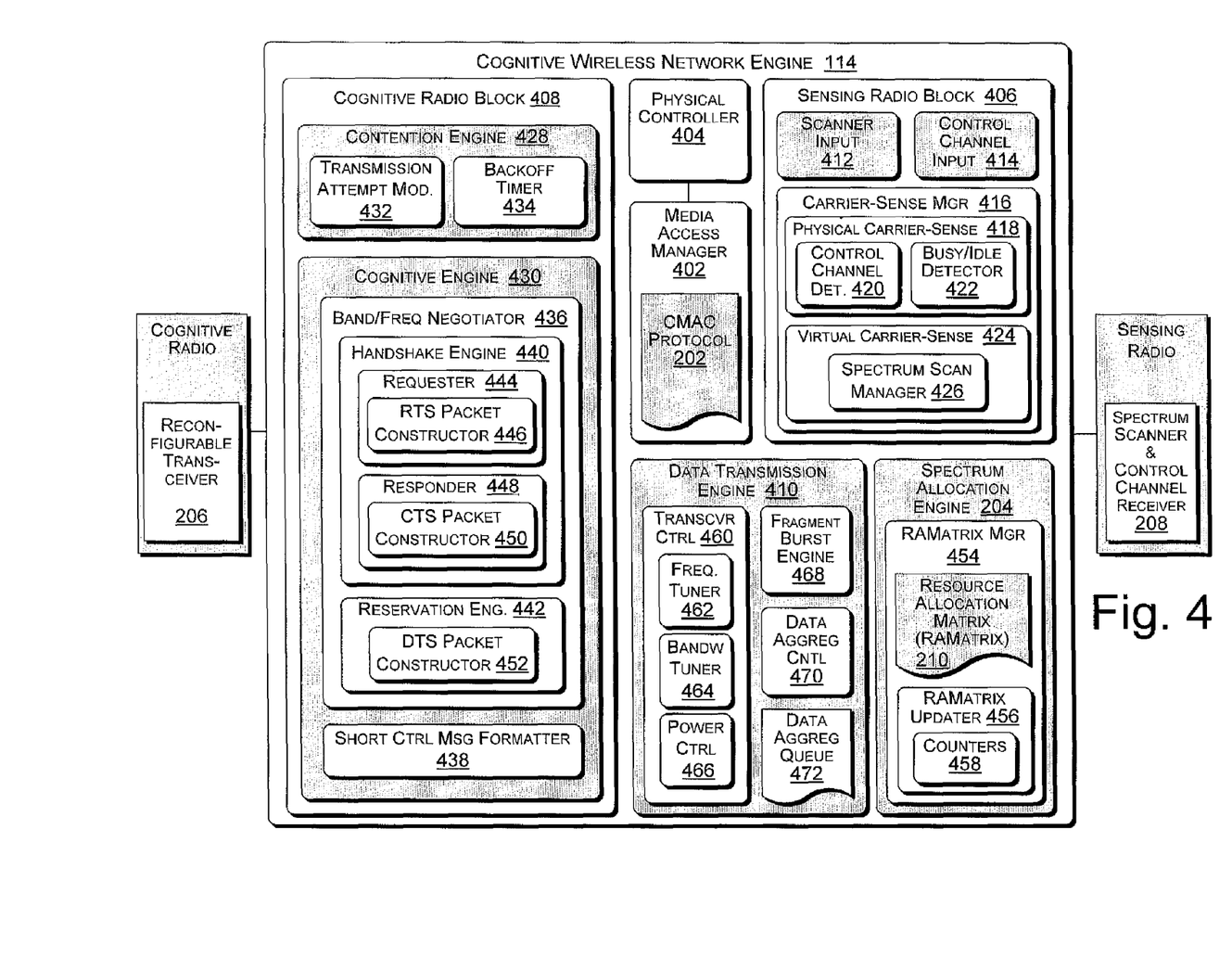
FIG. 4 is a block diagram of the exemplary cognitive wireless networking engine shown in FIGS. 1 and 2, in greater detail.

FIG. 4 shows an implementation of the cognitive wireless networking engine 114 of FIG. 2, in greater detail. The illustrated implementation is only one example configuration, for descriptive purposes. Many other arrangements of the components of an exemplary cognitive wireless networking engine 114 are possible within the scope of the subject matter. Implementations of the exemplary cognitive wireless networking engine 114 can be executed in hardware, software, or combinations of hardware, software, firmware, etc.

In FIG. 4, the cognitive wireless networking engine 114 includes a media access manager 402 that embodies the CMAC protocol 202 and a physical controller 404 to implement the CMAC on the physical layer 212. The cognitive wireless networking engine 114 also includes a sensing radio block 406, a cognitive radio block 408, the spectrum allocation engine 204, and a data transmission engine 410.

The sensing radio block 406 includes a scanner input 412, a control channel input 414, and a carrier-sense manager 416. The carrier-sense manager 416 may further include a physical carrier-sense module 418 with a control channel detector 420 and a busy/idle detector 422, and a virtual carrier-sense module 424 with a spectrum scan manager 426.

The cognitive radio block 408 may further include a contention engine 428 and a cognitive engine 430. The contention engine 428 may further include a transmission attempt module 432 and a backoff timer 434. The cognitive engine 430 may further include a negotiator 436 and a short control message formatter 438. The negotiator 436 further includes a handshake engine 440 and a reservation engine 442. The handshake engine 440 further includes a requester 444 that includes an RTS packet constructor 446; and a responder 448 that includes a CTS packet constructor 450. The reservation engine 442 further includes a DTS packet constructor 452.

The spectrum allocation engine 204 may further include a RAMatrix manager 454 with a RAMatrix updater 456 and counter 458 for maintaining a current RAMatrix 210.

The data transmission engine 410 may further include a transceiver controller 460 with a frequency tuner 462, a bandwidth tuner 464, and a power controller 466. The data transmission engine 410 may also include a fragment burst engine 468, a data aggregation controller 470, and a data aggregation queue 472. The illustrated configuration is just one example arrangement for the sake of description. Many other arrangements are also possible within the described subject matter.

Introductory Operation of the Exemplary Engines

For a node 106 to transmit, it monitors the control channel 116 and determines if the receiver 108 is available, and checks if the number of the packets in its queue 472 exceeds a threshold or alternatively, a time-out has occurred in which case a packet transmission is triggered even if the node's queue length is below the threshold. Minimum packet sizes prevents the control channel 116 from becoming a bottleneck—i.e., when traffic for reserving spectrum for many short communications clogs the control channel 116, as opposed to reserving spectrum for longer communications. In case a transmission is triggered, the node 106 uses its contention engine 428 to vie for transmission access to the control channel 116. The contention method can be the same as the CSMA/CA mechanism, which is adopted by the IEEE 802.11 MAC or it can be any other contention resolution mechanism known in the art. When the transmitting node 106 wins access to the control channel 116, it exchanges short control messages, with exemplary formatting to be described further below with respect to FIG. 6. The short control messages to be exchanged with the receiver 108 include: request to send (RTS), clear to send (CTS), and data transmission reservation (DTS). During this handshake procedure, the sender 106 derives candidate operating frequencies using its own RAMatrix 210, and begins to reserve the spectrum by sending RTS with suggested reservation parameters. The receiver node 108 verifies the proposed candidate operating frequencies using its own RAMatrix 210 and selects one operating frequency that is also free at the receiver. It conveys its selection to the sender by sending a CTS control packet that contains its spectrum band choice. The transmitting node 106 acknowledges the receiver 108 and reserves the spectrum using DTS. The handshake procedure will be described again with respect to FIG. 5. When the reserved frequency becomes available, both sender 106 and receiver 108 switch to the scheduled frequency and band (resource block), and use their data transmission engines 410 to transmit packets.

Physical 418 and virtual 424 carrier-sense functions are used to determine the status of the medium (e.g., in one implementation, the TV band). In one implementation, when either function indicates a busy medium the medium is considered busy; otherwise, it is considered idle.

The virtual carrier-sensor 424 is to be provided by the MAC layer, i.e., CMAC 202, and determines the state of the entire band of the medium 110. The RAMatrix 210 is the data structure used to map the state of the entire band. The RAMatrix 210 maintains a two-dimensional view of further traffic in the spectrum, e.g., based on duration information that is announced in prior RTS/CTS/DTS packets.

The carrier-sense manager 416 may derive a busy or idle state of the control channel 116 from various information sources, such as the RAMatrix 210, the transmitter status, and/or the physical carrier sensor 418. In alternative implementation, in which no control channel 116 is used, (e.g., for other media) the carrier-sense manager 416 may use only the RAMatrix 210 to determine the idle/busy state of a particular band.

The contention engine 428 is only used when the implementation utilizes a control channel 116, and may be the same as CSMA/CA. In particular, if a transmitting node 106 senses a busy control channel, it generates a random backoff timer chosen uniformly from a contention window. This will be described in greater detail, further below.

Upon winning the access to control channel 116, the transmitting node 106 and the receiving node 108 use their negotiator 436 and handshake engines 440 to exchange short control messages, negotiate the operating band, and reserve the band.

The transmitting node 106 sends out a RTS packet that has relevant information from its current RAMatrix 210 view for suggesting candidate (open) spectrum segments. In one implementation, the receiving node 108 selects from among the proposed candidate spectrum segments conveyed in the RTS packet and sends a CTS packet back with the information (i.e., its chosen spectrum segment). Upon receiving the CTS packet, the transmitting node 106 sends out a DTS packet to acknowledge the reservation of the spectrum segment—i.e., the resource block 302. Neighboring nodes, overhearing the CTS/DTS packets, update their RAMatrices 210, e.g., by adding the data duration field of CTS/DTS to the counter 458 associated with the channel specified the channel ID field. In one implementation, the duration field in each frame is only used to update the counter associated with the control channel 116. In other implementations, the transmitting node 106 may make the final decision of a resource block 302. Either way, each decision is made locally. Each time, a node may make a different decision based on current demand and spectrum usage status.

In one implementation, the exemplary system 100 adopts a fixed bandwidth allocation mechanism. The spectrum (e.g., 200 MHz) is divided into 10 channels, and the bandwidth of each channel is 20 MHz. In another implementation, the system supports different bandwidths including 1.25 MHz, 2.5 MHz, 5 MHz, 10 MHz, 20 MHz, 40 MHz. The power controller 466 can adjust transmission power within the power constraints to best serve the communication needs and maximize the spectrum reuse.

After the nodes switch to the selected resource block 302, the data transmission engine 410 may burst data packets in that resource block 302 until that the reserved duration is consumed.

In one implementation, the CMAC 202 implements a data aggregation controller 470 in the interface queue; the data aggregation queue 472. If possible, the number of packets to be sent to the receiving node 108 should occupy the data channel for a threshold time that prevents the control channel 116 from becoming a bottleneck if setting up too many short data exchanges.

In one implementation, the data transmission procedure in CMAC 202 is contention-free. The RAMatrix 210 maintained by each node ensures that the channel is reserved for the transmitting and receiving nodes. The fragment burst engine 468 can use the mechanism in IEEE 802.11 to transmit packets in the selected resource block 302. When the source node 106 transmits a fragment, it releases the channel, then immediately monitors the channel for an acknowledgment to continue with another fragment. The process of sending multiple packets after contending for the channel is known as packet burst. If the source node 106 receives an acknowledgment but there is not enough time to transmit the next fragment and receive an acknowledgment due to an impending dwell boundary, the source node 106 contends for the channel at the beginning of the next dwell time.

Exemplary CMAC: Spectrum-Aware MAC

In one implementation, the CMAC protocol 202 implements two main functions: it achieves collaborative sensing by combining scanning results in a one-hop neighborhood, and it realizes a spectrum reservation scheme using a common control channel 116.

As introduced above, when a node 102 has packets to send its contention engine 428 first contends for access to the control channel 116. The transmission attempt module 432 and backoff timer 434 may implement CSMA/CA and random backoff mechanisms of IEEE 802.11, or any other contention resolution mechanism. The negotiator components 436 in a pair of communicating nodes (e.g., 106 and 108), upon winning access to the control channel 116, perform a three-way handshake (RTS, CTS, DTS). During the handshake process, the handshake engines 440 of the sender and the receiver exchange parts of their local view of spectrum usage, decide upon the spectrum block to use for the communication, and announce the reservation to their neighbors. On receiving such a reservation packet, neighboring nodes store the reservation information in their local RAMatrix 210 structures. At the start of the reserved time period, the CMAC protocol 202 tunes the reconfigurable radio 206 to the selected spectrum band and initiates the exchange of packets without any backoff.

Exemplary Handshake

Figure 5:
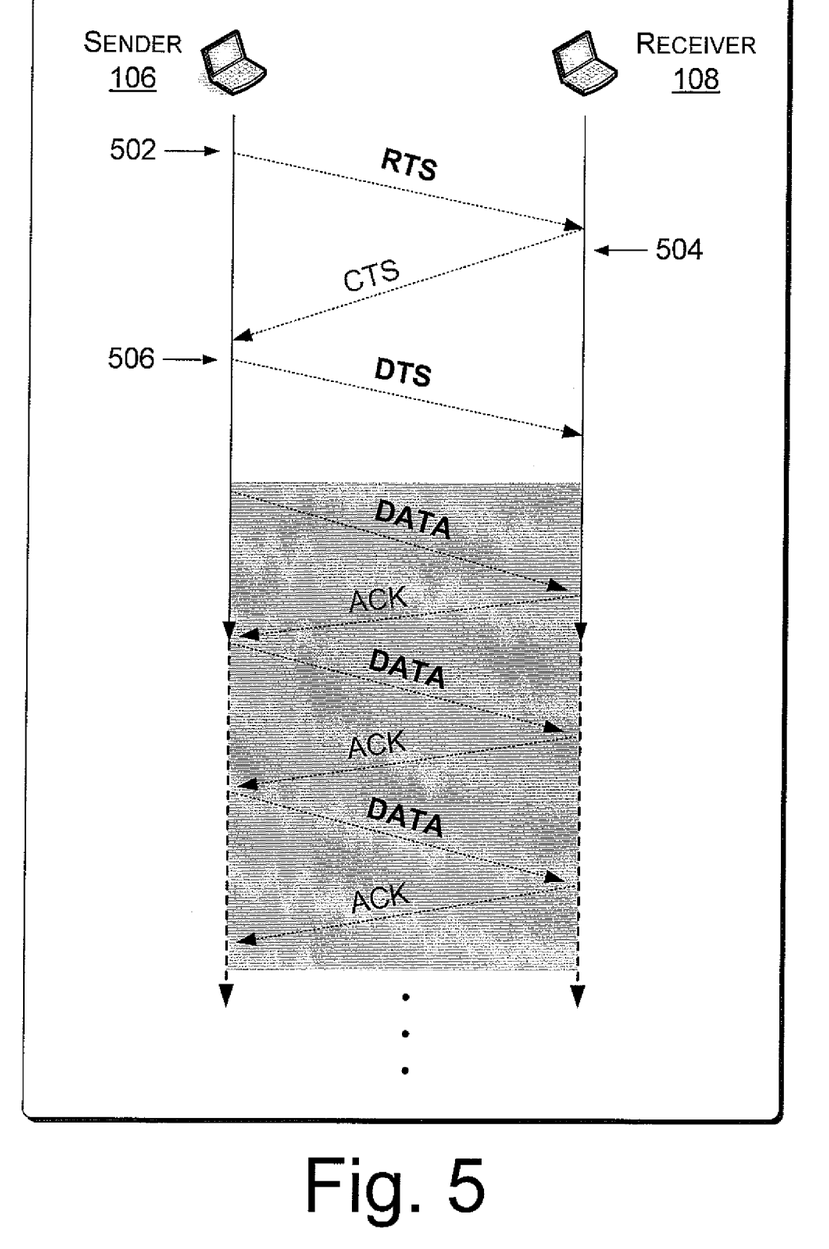
FIG. 5 is a diagram of an exemplary handshaking procedure and data transmission process.
Figure 6:
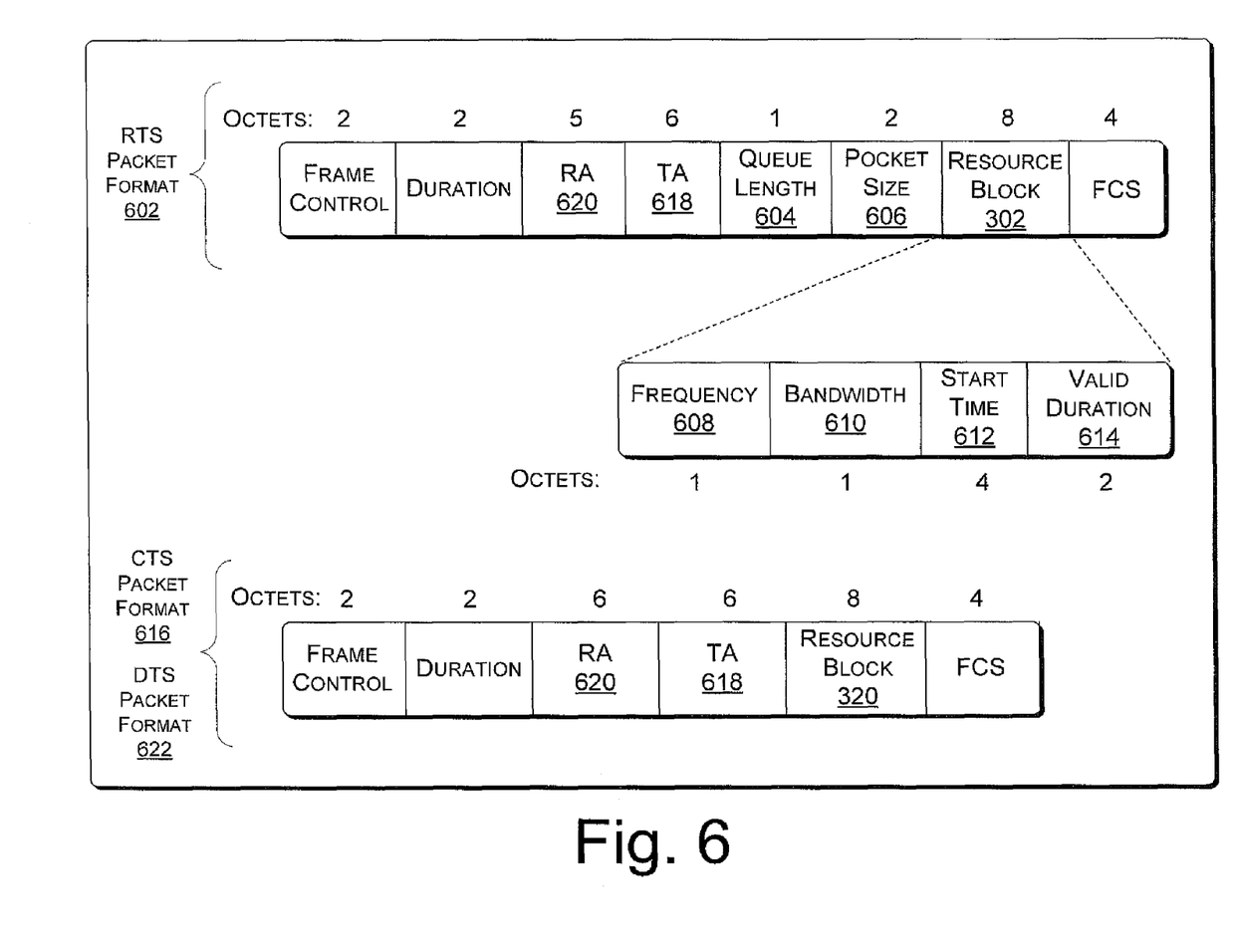
FIG. 6 is a diagram of exemplary packet structure for the exemplary handshaking procedure of FIG. 5.

As shown in FIG. 5, in one implementation, the CMAC protocol 202 uses a three-way handshake, which builds on and extends IEEE 802.11's two-way RTS (request-to-send) and CTS (clear-to-send) handshake. Before the handshake process, as mentioned above, the senders contend for spectrum access on the control channel 116, e.g., using the random backoff mechanism of IEEE 802.11. The requester 444 component of the winning node 106 sends (502) a modified RTS packet to carry traffic load information and several proposed "resource blocks" to the receiver 108. A resource block 302 is specified by its frequency interval ($f_0$, $f_0+f\Delta$) and the time interval ($t_0$, $t_0+t\Delta$). The regular control packets and the exemplary extended versions are shown in FIG. 6. The modified RTS packet format 602 incorporates the fields of "queue length" 604 (1 byte) and "average packet size" 606 (2 bytes) to describe the traffic load at the sender 106 to the corresponding receiver 108. The RTS packet format 602 also includes multiple resource blocks 302, each denoted by four fields: the starting frequency $f_0$ 608 (1 byte), the bandwidth $\Delta f$ 610 (1 byte), the start time $t_0$ 612 (4 bytes), and the duration $\Delta t$ 614 (2 bytes). The starting frequency field 608 can record the offset value from the start frequency of the TV spectrum, which is 512 MHz in one system. One implementation uses 1 byte to denote frequency 608 and bandwidth 610; this provides a resolution of 1 MHz. The start time 612 and duration 614 fields provide a timing resolution of one microsecond.

On receiving the RTS packet 602, the receiver 108 chooses a resource block 302 and informs the sender 106 using a modified CTS packet 616. The extended CTS packet 616 contains address fields of the sender 618 and the receiver 620, and details of the selected resource block 302. An exemplary new control packet, DTS (Data Transmission reServation) follows a similar format 622. The sender 106 uses DTS 622 to announce the spectrum reservation after receiving the CTS packet 616. CTS packets 616 and DTS packets 622 may have the same format. Every node 102 hears CTS packets 616 and DTS packets 622 sent by its neighbors to build the RAMatrix 210, which is a local view of spectrum usage in frequency and time. An entry in the structure of the RAMatrix 210 corresponds to one reservation, denoted by the source 618 and destination addresses 620 and the resource block 302. The RAMatrix 210 is updated each time the node 108 receives or overhears a new CTS packet 616 or DTS packet 622.

To reduce the time overhead caused by reservation, nodes 102 are allowed to make advanced reservations. Therefore, the handshake engine 440 may perform handshaking in parallel with the data transmission engine's 410 data transfers. In one implementation, for design simplicity, each node 106 may only be allowed to have at most one valid outstanding reservation.

The RTS packet 602 can carry more than one resource block 302 to convey more spectrum usage information to the receiver. However, the more information RTS 602 carries, the higher will be the overhead on the control channel 116. In one implementation, using 1-2 resource blocks 302 is optimal.

Exemplary Data Transmission

A sender 106 uses the reserved resource block 302 to send data to the intended receiver 108. When a pair of communicating nodes switches to the selected segment of spectrum (resource block 302), they first perform physical-layer carrier sensing 418. If the selected spectrum is clear, nodes exchange packets without further back-off and without contention. Since the sender 106 has exclusive access to the resource block 302, it can choose to transmit multiple packets back-to-back during the defined period.

Note that it is possible that after switching, the sender 106 or the receiver 108 may find the selected band to be busy; this may happen for three reasons:

1. The selected band may suffer from interference from transmissions in adjacent frequency bands.

2. The sender 106 or the receiver 108 may experience deep fading in the selected band, and/or 3. Conflicting reservations may occur due to loss of control packets.

If the sender 106 or the receiver 108 senses that the selected band is busy, it gives up the current resource block 302, and switches back to the control channel 116. If the other node does not sense the medium 110 to be busy, and is unable to send or receive, it will wait for a pre-defined interval before switching back to the control channel 116.

Collaborative Sensing

Ideally, there should be no communication by unlicensed users in a spectrum chunk when it is being scanned for TV signals. If so, this increases the accuracy of a scan. To achieve this goal, i.e., to prevent a neighbor from sending a packet in the spectrum chunk being scanned, a node 106 reserves the part of the spectrum it wants to scan by sending a DTS packet 622 with this information. Therefore, other nodes do not send a packet in that spectrum chunk, while it is being scanned by another node. During the scanning period, the reconfigurable radio 206 of the node 106 resides on the control channel 116, and collects control packets until the spectrum scan manager 426 finishes its task.

The CMAC protocol 202 aggregates scanning results from neighbors for better detection of incumbent operators. The CMAC 202 may extend the beacon frame format used in 802.11 with a bitmap field that carries local scanning results. A bit represents the occupancy status of the corresponding TV channel, with 0 for occupied and 1 for empty. In one implementation, the CMAC 202 can use up to 30 TV channels from channel 21 to channel 51 (except channel 37). The bitmap field, therefore, requires 4 bytes to reflect the activities in the UHF spectrum. Each node transmits the beacon message every beacon interval (typically 100-200 ms). A node receiving a beacon message updates the stored scanning results by applying a bit-wise AND operation.

Time Synchronization

The CMAC protocol 202 performs spectrum allocation via a reservation-based mechanism; hence it is important to ensure that the nodes have synchronized clocks. The timestamp field in the aforementioned beacon message is used for time synchronization. The timestamp field is 64 bits and offers microsecond time resolution. To synchronize the system clock, upon receiving the beacon, the node records its local time, TL, extracts the timestamp field, TB, estimates the transmission time of the beacon, t, and then synchronizes its system clock by adding $(T_B+t)-T_L$. To avoid cyclic synchronization, nodes only synchronize to the faster clock in the system. The accuracy of time synchronization is affected by the interrupt handler and the estimation of propagation delay, which vary across different systems. In the exemplary cognitive wireless networking system 100, nodes make reservations only with their one-hop neighbors. Therefore, focus is on the clock skew among one-hop neighbors. The clock skew among nodes within one hop can be controlled to less than 1 µs using beacon messages.

Bootstrap

To join a CMAC network, a new node performs the following operations. The spectrum scan manager 426 first uses the scanner 208 to generate a list of unused channels (e.g., TV channels), and at the same time tunes the reconfigurable radio 206 to the control channel, waiting for beacon messages from other nodes for time synchronization. After scanning completes, the node combines the scanning results obtained from beacons, and sends out a beacon frame every beacon interval.

Exemplary Spectrum Allocation

Figure 7:
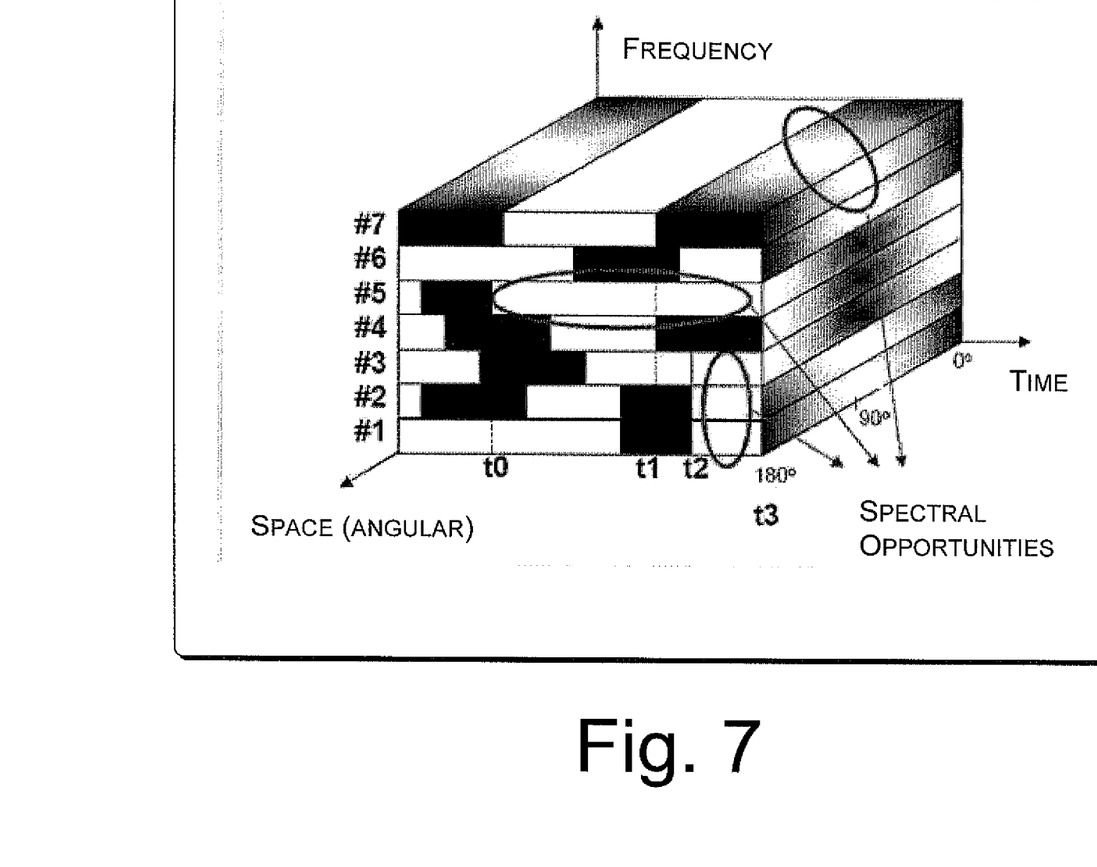
FIG. 7 is a diagram of idle spectrum resources to be allocated by the exemplary spectrum allocation engine.
Figure 8:
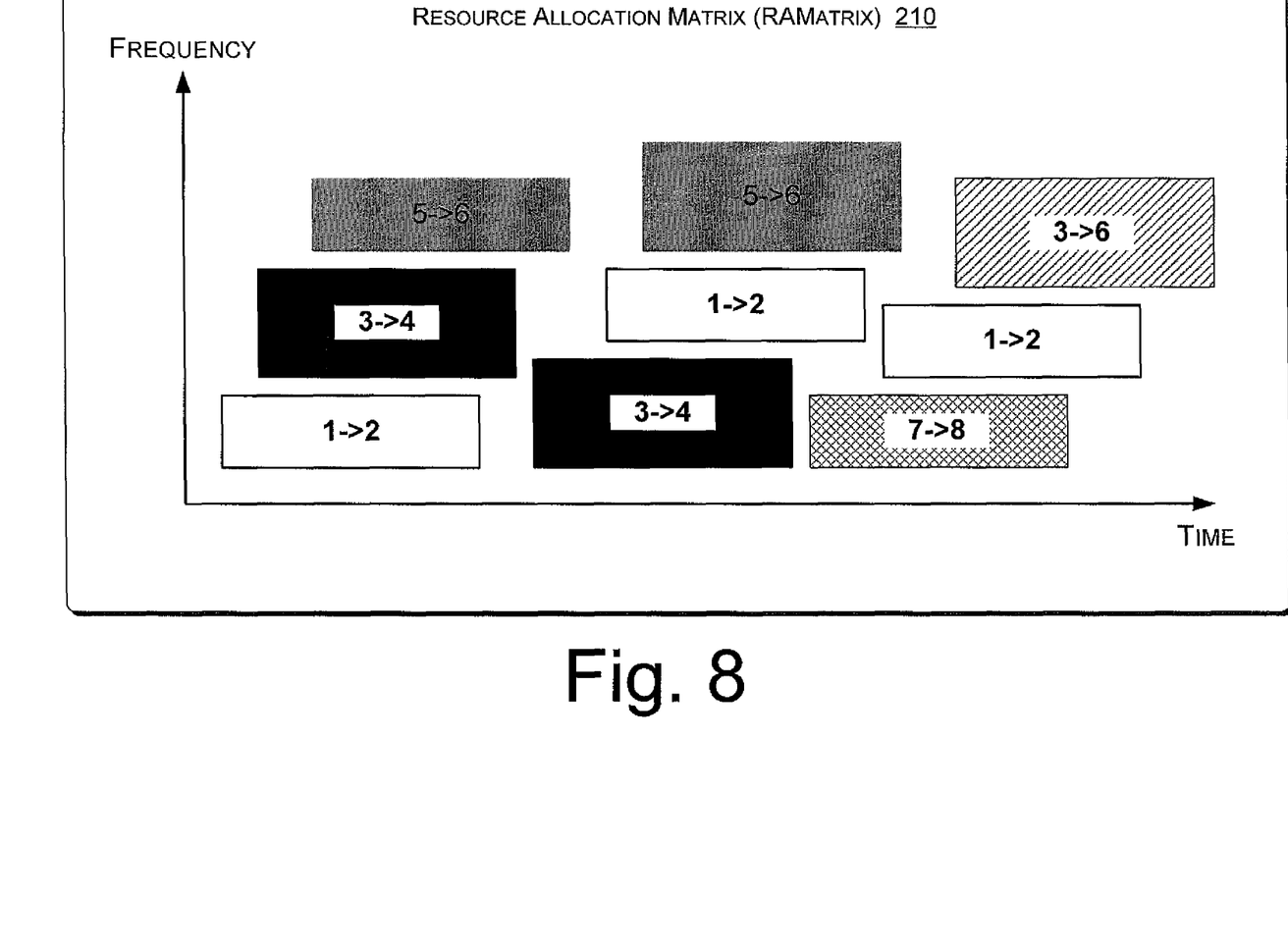
FIG. 8 is a diagram of an exemplary resource allocation matrix showing reservation of different size resource blocks.

The exemplary spectrum allocation engine 204 performs distributed spectrum allocation over white spaces in the medium 110, as shown in FIG. 7, and provides the intelligence for efficiently packing communication in time, frequency, and space, as shown in FIG. 8. The goal of the exemplary spectrum allocation engine 204 is to maximize spectrum utilization while being fair to all users.

The exemplary spectrum allocation engine 204 is invoked at a sender node 106 when it is not actively transmitting any packet, and when it senses the control channel 116 is free. The node 106 first examines the status and the output packet queues for each of its neighbors, to decide whether it should initiate a reservation. A neighbor is considered eligible if it does not have an outstanding reservation, and the output packet queue for this neighbor has accumulated enough packets to amortize the control overhead, or the queue 472 has timed out for packet aggregation (to avoid excessive delay). In order to ensure that the control channel 116 does not become a bottleneck, the CMAC protocol 202 ensures that (unless a queue times out, in which case the transmission is triggered to avoid transmission delays to become too long) each transmission has a minimum duration length when the smallest possible bandwidth is chosen. In one implementation, the minimum transmission duration is denoted by $T_{min}$. To maintain fairness among neighbors a round-robin scheduler may be used to elect an eligible receiver.

The node 106 proposes several candidate resource blocks 302 to the receiver 108 for reservation; such decisions are made based on its packet queue 472, the spectrum usage, and the perceived contention intensity in its vicinity. This decision triggers CMAC 202 to initiate a handshake procedure. The spectrum allocation engine 204 at the receiver 108 updates and finalizes the resource block parameters—frequency, bandwidth, start time, duration—based on its RAMatrix 210.

As mentioned earlier, a resource block 302 is specified using four parameters: the starting frequency $f_0$ 608, the bandwidth $\Delta f$ 610, the starting time $t_0$ 612, and the time duration $\Delta t$ 614. Intuitively, this can be viewed as a rectangular block 302 in the time-frequency space. The spectrum allocation engine 204 first decides the size of the block, as specified by $\Delta t$ and $\Delta f$, and then decides how to place the block in the time-frequency space. A simple placement strategy is adopted in one implementation: The block 302 is placed at a position that results in the smallest finishing time, $t_0+\Delta t$; ties are broken randomly or arbitrarily.

The spectrum allocation engine 204 also determines the shape of the block 302, $(\Delta t, \Delta f)$. In one implementation, two key guidelines are used in making this decision:

(1) The spectrum allocation engine 204 aims to make $\Delta t$ large enough to amortize the incurred overhead in the control channel 116 for reservation, such that the control channel 116 does not become the performance bottleneck; that is, $\Delta t \geq T_{min}$. The exact formula for $T_{min}$ will be described below.

(2) The spectrum allocation engine 204 aims to make $\Delta f$ large enough to achieve a high data-rate, but in order to maintain fairness, $\Delta f$ should not exceed B/N by too much, where B is the total available bandwidth and N is the number of concurrent transmissions in the interference range.

In one implementation, for determining the value of Δf, if there are only few potential concurrent transmissions, each one uses a large bandwidth to avoid wasting the resource. Moreover, when the number of users exceeds a threshold, the available spectrum is still divided among all concurrent users, instead of allocating the total spectrum to only one user at a time. At least three rationale are provided for dividing the spectrum into segments of smaller bandwidth when the number of users is large:

First, a smaller bandwidth decreases the physical-layer data rate and increases the data transmission duration. The overall spectrum efficiency, however, is increased due to the reduced percentage of signaling overhead associated with every data transmission. For example, if there is a fixed 100 μs overhead associated with each transmission and the actual data transmission takes 200 μs in a 1 MHz band and 100 μs in a 2 MHz band, then two parallel transmissions in two 1 MHz bands yields an efficiency of 67%, whereas a transmission in one 2 MHz band yields an efficiency of 50%. Second, the fine control of bandwidth provides an adequate number of channels and offers high accessibility to the spectrum. The dynamic spectrum allocation, therefore, achieves better delay and jitter performance, which is preferable for TCP traffic. Finally, the reduced bandwidth allows more parallel transmissions, which reduces contention in the control channel 116.

Two rules can be applied to determine (Δt,Δf). Due to hardware limitations in some implementations, the reconfigurable radio 206 can only work with a limited number of bandwidth options, say, b1<b2< ... <$b_n$. Hence, Δf has to be within this set of finite choices. The bandwidth option just exceeding B/N, say $b_i$, is first examined. Then the length of the queue 472 to the receiving node 108 can be checked and the transmission duration Δt estimated when using a bandwidth of $b_i$ for communication. If the resulting transmission duration Δt is at least $T_{min}$, then this pair (Δt,Δf) is determined. Otherwise, the spectrum allocation engine 204 checks the next smaller bandwidth option, and so on. The spectrum allocation engine 204 can apply the iteration above to generate multiple candidates of (Δt,Δf) at the sender 106.

For setting $T_{min}$, Equation (1) provides:

$$C_{max} \triangleq \frac{B}{b_1}, \quad (1)$$

where $b_1$ is the smallest bandwidth supported by the reconfigurable radio 206. The quantity $C_{max}$ is the maximum number of parallel transmissions. $T_{min}$ can be derived as in Equation (2):

$$T_{min} = C_{max} \cdot T_o = \frac{B}{b_1} \cdot T_o \quad (2)$$

where $T_o$ is the time required for handshake on the control channel 116. From this, it is seen that supporting a wider data spectrum requires a larger $T_{min}$.

The reason for setting $T_{min}$ as shown in Equation (2) is because the maximum rate $R_f$ at which reservations are generated, is $1/T_o$. $R_f$ is also the rate at which the nodes leave the control channel 116 and start their transmissions. $1/T_{min}$ is the rate at which a pair of nodes finishes transmission and returns to the control channel 116. If the spectrum is fully utilized, there is a total of $C_{max}$ parallel transmissions. Hence the returning rate $R_r$ is $C_{max}/T_{min}$. To prevent the control channel 116 from becoming a bottleneck, the rate of generating handshakes, $R_f$, should exceed the returning rate, $R_r$.

There is a low-complexity method for estimating N, the number of disjoint transmissions. As mentioned above, the exemplary adaptive spectrum allocation methods hinge upon a parameter, N, which is the number of disjoint transmissions. This quantity depends on network topologies and user traffic patterns, and varies over time. The computation cost, however, has to be minimal, since such computation is repeated in a fine time scale (10's of milliseconds).

In one implementation, the number of valid resource blocks 302 in the local RAMatrix 210 can be used as an approximation of N. In the exemplary cognitive wireless networking system 100 no user is allowed to have more than one outstanding reservation. A reservation that has not expired means that either the corresponding nodes are currently transmitting or they are waiting for their reserved block's 302 start time to arrive. Such approximation can effectively track the number of disjoint transmissions especially when the flows are long-lived and have enough packets.

This approximation method is distributed and easy to compute. Furthermore, the method is responsive to user and traffic dynamics. For example, if a transmission created by two new nodes becomes active, other nodes learn the transmission after the corresponding nodes finish the first handshake.

Initially, when new nodes join the exemplary cognitive wireless networking system 100, it takes them a time period, the "learning period," to learn of the existence of contending transmissions. The length of the learning period depends on the number of new nodes and traffic patterns.

Regarding fairness of spectrum allocation between nodes, since the reservations contend in the control channel 116 via a mechanism adopted from 802.11, the exemplary cognitive wireless networking system 100 preserves long-time access fairness properties similar to the ones of IEEE 802.11. Thus, for scenarios in which all nodes are within radio range of each other, the exemplary cognitive wireless networking system 100 can provide flows with the same access right to the control channel 116 as long as the number of transmissions does not exceed $C_{max}$. As a result, all flows roughly receive a fair share of resource blocks 302. In the case of N>$C_{max}$, the exemplary cognitive wireless networking system 100 may suffer from a known fairness problem of the back-off protocol more than IEEE 802.11. A node 106 that has just finished transmitting has a higher chance of recapturing the channel than other nodes, because its back-off window is smaller and hence, its probability of sending an RTS 602 is higher. That is, nodes that were able to transmit on the medium will have a higher chance of winning the contention again. While in a single channel IEEE 802.11 environment, there is always only one such favored transmission, there can be a number up to $C_{max}$ of such favored transmissions in the exemplary cognitive wireless networking system 100 system, which can aggravate the fairness problem if N becomes large. In particular, certain nodes can starve: If a node does not win the contention for a long time, its contention window keeps increasing, while numerous other transmitters return to the control channel after having finished their data transmissions. If each such node resets its contention window to the minimum size, the node with large contention window will have an increasingly small chance of gaining the contention. For this reason, one implementation of our invention uses a different contention window mechanism in which nodes that return to the control channel do not necessarily reset their contention window to the minimum size. Instead, the size of the contention window upon finishing a transmission and returning to the control channel is determined based on the total number of users in the local vicinity.

Exemplary Method

Figure 9:
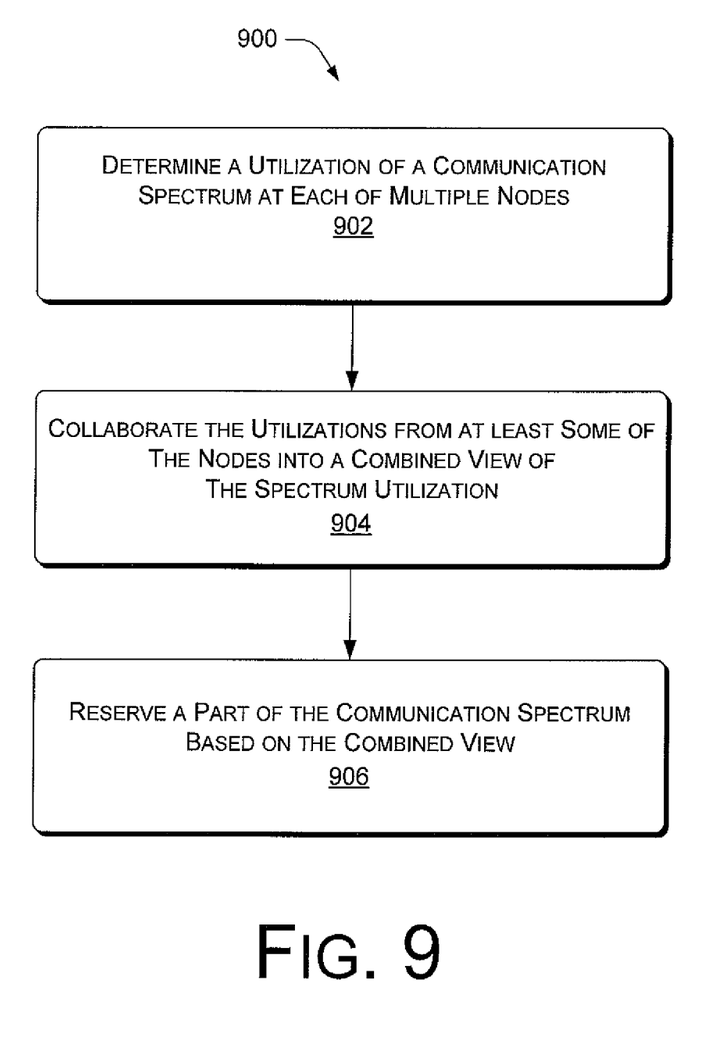
FIG. 9 is a flow diagram of an exemplary method of utilizing a communication spectrum.

FIG. 9 shows an exemplary method 900 of utilizing a communication spectrum, such as a RF spectrum. In the flow diagram, the operations are summarized in individual blocks. The exemplary method 900 may be performed by hardware, software, or combinations of hardware, software, firmware, etc., for example, by components of the exemplary cognitive wireless network system 100.

At block 902, utilization of a communication spectrum is determined at each of multiple nodes. An exemplary new MAC protocol provides a set of conventions for achieving collaborative sensing of the communication spectrum, such as a TV band, via combining scanning results from multiple independent nodes that each carry an individual version of a spectrum usage matrix.

At block 904, the utilizations from at least some of the nodes are collaborated into a combined view of the spectrum utilization. The new MAC protocol provisions a spectrum allocation technique that uses the spectrum usage matrix to efficient calculate resource blocks within the available idle white spaces in the communication spectrum.

At block 906, a part of the communication spectrum is reserved based on the combined view. The new MAC protocol contains a second set of conventions for reserving idle parts of the communication spectrum. The resource blocks are calculated in response to the number of nodes requesting bandwidth and according to several other factors. The exemplary spectrum allocation technique crafts resource blocks to be reserved, such that the spectrum is utilized most efficiently, multiple simultaneous communication requests each get immediately serviced, and the planned communications all finish in the shortest amount of time. The exemplary method 900 can provide a 200% throughput improvement over conventional systems that use an IEEE 802.11-based MAC protocol.

CONCLUSION

This disclosure describes a new media access control (MAC) protocol for cognitive wireless networks. Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
   under control of one or more computer systems configured with executable instructions,
      monitoring, by a scanner radio of a network node, a control channel to identify spectrum reservations announced by additional network nodes in communication with each other;
      determining, by the network node, a utilization of a communication spectrum at each of the additional network nodes based on the monitoring of the control channel;
      aggregating, by the network node, the utilizations from at least some of the additional network nodes into an aggregated utilization of the communication spectrum;
      reserving, by the network node, a part of the communication spectrum for an exchange of information based on the aggregated utilization using the control channel, the control channel being an unfixed control channel having a lower transmission range than transmission ranges associated with the exchange of information;
      scanning, by the scanner radio of the network node, a particular portion of the communication spectrum to identify vacant portions of the communication spectrum for an exchange of packets with the particular additional network node;
      monitoring the control channel, by an additional radio of the network node, while the scanner radio is scanning the particular portion of the communication spectrum; and
      after the scanner identifies vacant portions of the communication spectrum for the exchange of packets with the particular additional network node, tuning the additional radio of the network node to the identified vacant portions of the communication spectrum to perform the exchange of packets with the particular additional network node.

2. The method as recited in claim 1, wherein reserving a part of the communication spectrum includes negotiating a resource block in the communication spectrum, between the network node and a particular additional network node.

3. The method as recited in claim 2, wherein negotiating the resource block includes determining an available frequency in the communication spectrum, determining a bandwidth around the frequency, determining a starting time, and determining a duration for the exchange of information using the frequency and the bandwidth.

4. The method as recited in claim 2, wherein the negotiating includes sending a request-to-send (RTS) packet from the network node to the particular additional network node, wherein the RTS packet structure contains a view of the spectrum utilization at the network node.

5. The method as recited in claim 2, wherein the negotiating includes sending a request-to-send (RTS) packet from the network node to the particular additional network node, wherein the RTS packet structure designates candidate idle segments of the spectrum.

6. The method as recited in claim 2, wherein the negotiating includes receiving a clear-to-send (CTS) packet from the particular additional network node, wherein the CTS packet structure contains a view of the spectrum utilization at the particular additional network node and the CTS packet structure designates candidate idle segments of the spectrum.

7. The method as recited in claim 2, wherein the negotiating includes sending a data transmission reservation (DTS) packet from the network node to the particular additional network node, wherein the DTS packet structure contains a reservation defining a segment of the spectrum to reserve, wherein the reservation includes a frequency, a bandwidth around the frequency, a starting time, and a duration.

8. The method as recited in claim 1, wherein determining a utilization comprises determining a utilization of the television broadcast spectrum.

9. The method as recited in claim 1, wherein data exchanged on the unfixed control channel informs the network node and one or more of the additional network nodes of the spectrum utilization viewed at particular additional network nodes.

10. The method as recited in claim 1, further comprising:
    storing the spectrum utilization in a matrix at the network node; and
    sharing at least part of the matrix with one or more of the additional network nodes.

11. The method as recited in claim 1, wherein determining a utilization of the communication spectrum includes scanning the communication spectrum to determine current users and their associated frequencies.

12. The method as recited in claim 1, wherein determining a utilization of the communication spectrum includes monitoring the unfixed control channel to update the aggregated utilization of the communication spectrum.

13. A cognitive wireless network system, comprising:
a scanner radio;
an additional radio;
a network node comprising a cognitive wireless networking engine configured to:
   implement a cognitive media access control (MAC) protocol that provisions collaborative sensing of communication spectrum utilization by a plurality of additional network nodes via a communication control channel common to the network node and the plurality of additional network nodes via the scanner radio, wherein the communication control channel comprises a shorter wireless range of frequency than a range of wireless frequencies reserved for data exchange and wherein the communication control channel is configured to hop across multiple channels within a spectrum of control frequencies;
   determine whether an output queue of the network node includes a threshold number of packets;
   monitor the communication control channel;
   determine whether an output queue of an other network node includes a particular number of packets via the communication control channel; and
   negotiate and reserve idle blocks of the communication spectrum via the communication control channel to exchange data with the other network node via the additional radio based at least in part on a determination that the output queue of the network node includes at least the threshold number of packets and a determination that the output queue of the other network node includes at least the particular number of packets, the data to be exchanged including data of the output queue of the network node and the output queue of the other network node.

14. The cognitive wireless network system as recited in claim 13, wherein the network node and the plurality of additional network nodes negotiate adaptive spectrum allocation such that the network node and the plurality of additional nodes self-organize into a network without coordination from a central controller.

15. The cognitive wireless network system as recited in claim 13, wherein the network node and each of the plurality of additional network nodes include a first radio for scanning the communication spectrum for the idle blocks and a second radio tunable to idle blocks of various frequencies for data communication.

16. The cognitive wireless network system as recited in claim 15, wherein the first radio or the second radio also monitors the movable communication control channel.

17. The cognitive wireless network system as recited in claim 16, wherein the network node reserves a part of the communication spectrum via the movable communication control channel before scanning the part of the communication spectrum.

18. The cognitive wireless network system as recited in claim 13, wherein the movable communication control channel uses a higher frequency than frequencies reserved for data exchange.

19. A network node, comprising:
a memory;
one or more processors operatively coupled to the memory;
a first set of conventions, stored in the memory and executable on the one or more processors, for achieving collaborative sensing of a communication spectrum via combining scanning results communicated from an unfixed control channel; and
a second set of conventions, stored in the memory and executable on the one or more processors, for reserving idle parts of the communication spectrum using the unfixed control channel for an exchange of information, the unfixed control channel having a lower transmission range than transmission ranges associated with the exchange of information; and
a cognitive wireless networking engine, stored in the memory and executable on the one or more processors, for reserving the idle parts of the communication spectrum by sending to the additional network node a request to send packet including a plurality of proposed candidate spectrum segments for the network node to communicate with the additional network node, receiving from the additional communication device a clear to send packet indicating a particular spectrum segment of the plurality of proposed candidate spectrum segments that is to be used for data exchange between the network node and the additional network node, sending to the additional communication device a data transmission reservation packet to acknowledge reservation of the particular spectrum segment for data exchange between the network node and the additional network node, and transmitting one or more packets to the additional network node via the particular spectrum segment.

* * * * *